Sept. 24, 1935.  W. A. KOSKEN  2,015,344
PICTURE AND SOUND REPRODUCTION
Original Filed May 31, 1930   2 Sheets-Sheet 1
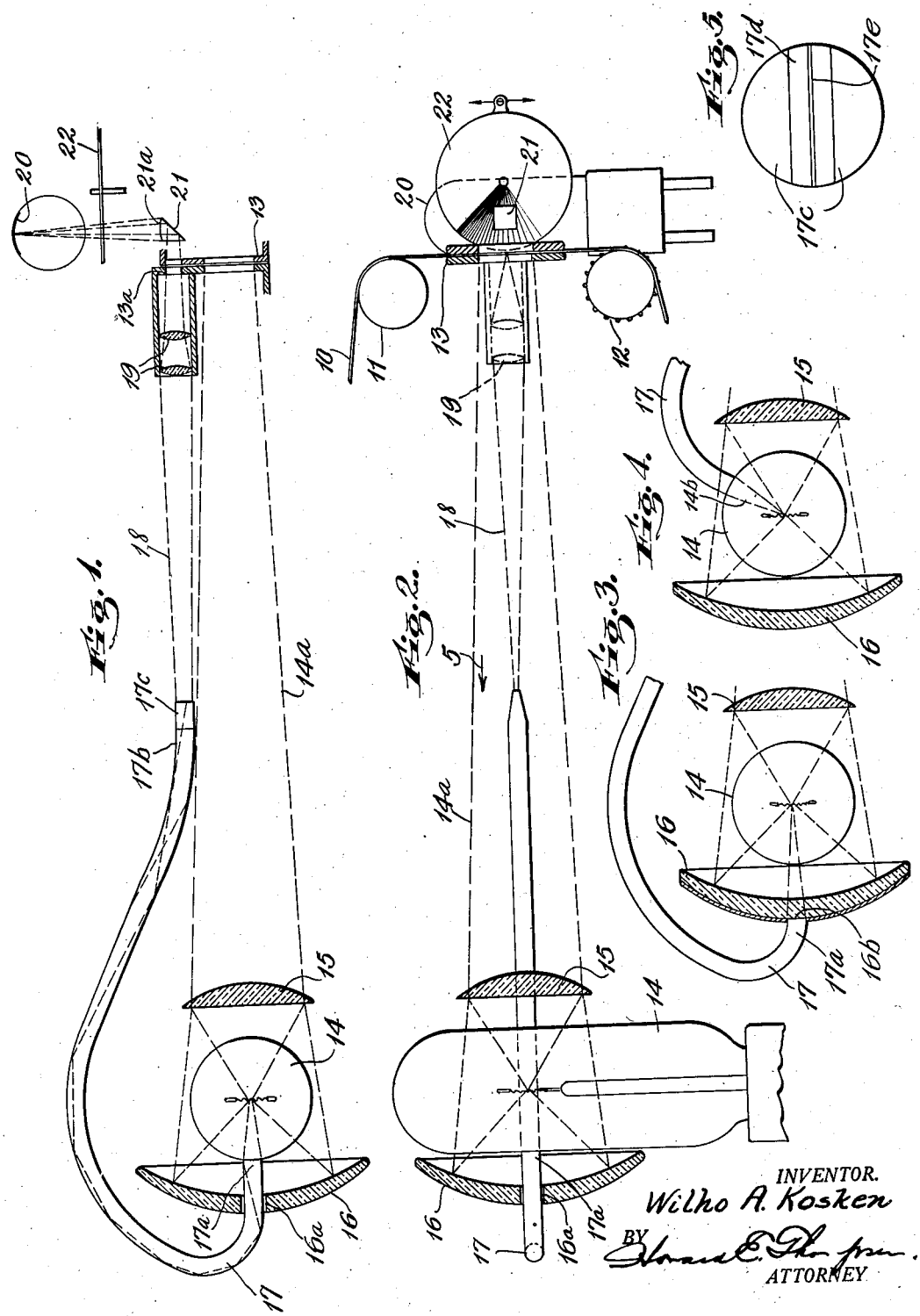
INVENTOR.
Wilho A. Kosken
BY
ATTORNEY Sept. 24, 1935.  W. A. KOSKEN  2,015,344
PICTURE AND SOUND REPRODUCTION
Original Filed May 31, 1930    2 Sheets-Sheet 2
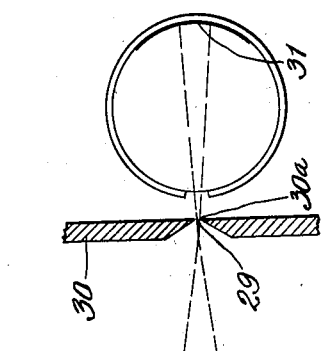
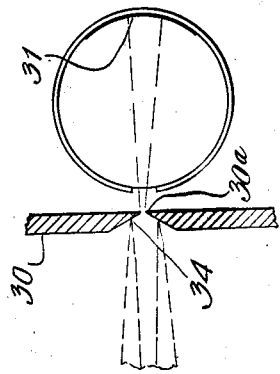
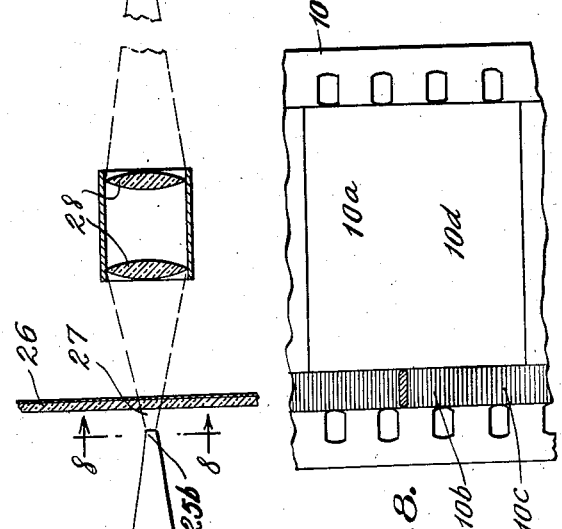
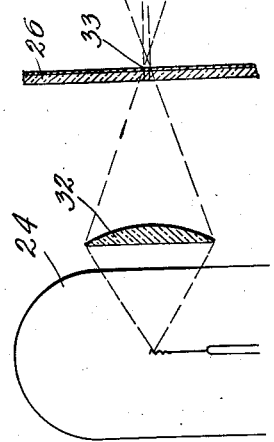
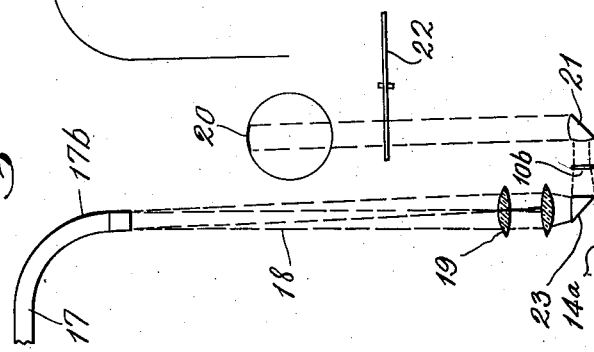
INVENTOR.
Wilho A. Kosken
BY
ATTORNEY Patented Sept. 24, 1935

2,015,344

UNITED STATES PATENT OFFICE 2,015,344

PICTURE AND SOUND REPRODUCTION

Wilho A. Kosken, Richmond Hill, N. Y., assignor to Wilho A. Kosken, Inc., a corporation of New York Application May 31, 1930, Serial No. 458,783
Renewed February 16, 1935

12 Claims. (Cl. 88—16.2)

This invention relates to motion picture projecting machines and particularly to machines of this type in conjunction with which sound reproducing means is employed; and the invention in addition to the combination set forth, relates to the manner of reproducing the sound, and still further my invention relates to an apparatus of the class specified wherein one source of light may be utilized for the reproduction of pictures and sound; and the object of the invention is to provide means operating in conjunction with the source of light employed for projecting the picture of a film onto a screen for transmitting light from said source onto the sound track of a film and thus onto a photo-electric cell; a further object being to control the thickness of the beam passed onto the sound track as well as for controlling the density of the light transmitted to the photo-electric cell; a further object being to provide a quartz rod for transmitting the light from said source to the sound track and photo-electric cell and especially in the provision of a rod of this character, one end of which is beveled or flattened to project a relatively wide and thin light ray onto the sound track of the film; a further object of my invention consists in the provision of means for transmitting a relatively large area of light through the sound track of a film and projecting the illuminated portion of the sound track to form a secondary image with means at the formation of the secondary image for permitting the projection of a relatively fine line of the sound track onto the photo-electric cell, means being provided to enlarge the secondary image, thus facilitating the projection of the minutest light beam onto the cell; a still further object being to provide an apparatus incorporating the features specified wherein the motion picture film is moved through the apparatus in a continuous motion rather than an intermittent motion and further wherein the sound waves of the sound track are arranged in such manner with respect to the successive pictures as to be in registering alinement and in juxtaposition to each other; and with these and other objects in view, the invention consists in an apparatus of the class and for the purpose specified which is simple in construction, efficient in use and which is constructed as hereinafter described and claimed.

The invention is fully disclosed in the following specification, of which the accompanying drawings form a part, in which the separate parts of my improvement are designated by suitable reference characters in each of the views, and in which:—

Fig. 1 is a diagrammatic plan view, illustrating the projection of light through a picture film and sound track of a film from a single source of light and the transmission of light from the sound track to a photo-electric cell.

Fig. 2 is a diagrammatic side view of the structure shown in Fig. 1.

Figs. 3 and 4 are views similar to Fig. 1 but showing only parts of the construction and showing modifications.

Fig. 5 is a view looking in the direction of the arrow 5 of Fig. 2, showing only a part of the construction on an enlarged scale.

Fig. 6 is a view similar to Fig. 1 showing only a part of the construction and illustrating a modified arrangement of the parts.

Fig. 7 is a diagrammatic side view of a modified form of apparatus which I may employ.

Fig. 8 is a detail view of a part of a film indicating the sound track thereon; and, Fig. 9 is a view similar to Fig. 7 showing another modification.

For the purpose of illustrating one method of carrying my invention into effect, I have diagrammatically illustrated in Figs. 1 and 2 of the drawings, parts of a motion picture projecting machine. In said figures, 10 represents a film passing over the usual guide and feed rollers 11 and 12 and through a film guiding device 13, it being understood that the film is preferably operated continuously.

The film 10 has a picture section 10a and a sound track 10b, the latter registering with an aperture 13a disposed at one side of the device 13. At 14, I have shown a source of light in the form of an electric bulb, which in the construction shown in said figures, will be of sufficient voltage and amperage to supply sufficient light to project the photographic images on the sections 10a of the film, a required distance onto a screen.

A lens 15 is preferably employed in front of the bulb 14 to aid in the projection of the light and a reflector 16 is arranged in back of the light with respect to the lens 15 so that the ray path 14a will extend to and through the guiding device 13 and the film arranged therein. In the construction shown in Figs. 1 and 2, the central portion of the reflector 16 is provided with an aperture 16a. Arranged in this aperture is one end of a quartz rod 17, said end 17a of the rod being arranged in abutting relation with respect to the bulb 14. Said rod 17 is bent around the reflector and extends forwardly, terminating in a relatively straight end portion 17b, arranged in parallel relation to the beam of light 14a. The free end of said rod is flattened on two sides as seen at 17c to form a substantially wedge end, terminating in a relatively narrow and elongated wall 17d, which is covered or coated with an opaque material or substance on which is cut or otherwise formed a relatively fine line 17e, through which the rays of light extending from the bulb 14 through the quartz rod is projected as indicated by the ray or beam of light 18. This beam of light is directed to the aperture 13a and thus to that part of the sound track 10b arranged in said aperture, the light passing through a simple, adjustable, projecting lens system 19, which is adapted to focus the light to form a relatively fine line where it engages and passes through the sound track 10b of the film, thus permitting more accurate transmission of the sound waves photographically represented upon said sound track onto the photo-electric cell which is indicated at 20.

The image is projected from the film onto the photo-electric cell through a prism 21, one surface 21a of which is preferably rounded. It is also preferable that a shade, shutter or screen 22 be adjustably supported in the path of light extending from the prism 21 to the photo-electric cell 20, so that the density or volume of the light transmitted onto the film may be controlled. While it may be possible to control the characteristics of the light in the use of the quartz rod and in the arrangement of such rod, it is preferred to incorporate the shutter 22 which, as will be understood, may be employed at any point between the source of light and the photo-electric cell.

In other apparatus of this class, it has been a problem to provide mechanical means for measuring the dimensions of the light rays projected onto and through the sound track to provide accurate reproduction of the sound recorded thereon. With the structure shown in Figs. 1 and 2, the size of the slot 17e is not an important factor as the lens system 19 operates to project the light rays onto the film in the minutest, hairline beam, thus accurately transmitting the photographic recording of the sound track onto the photo-electric cell.

In Fig. 3 of the drawings, I have shown a slight modification wherein the quartz rod 17 instead of passing through an aperture in the reflector 16, has its end 17a placed in abutting relation with a non-coated portion arranged centrally of the back of the reflector as seen at 16b. This construction produces substantially the same result as the structure shown in Figs. 1 and 2. In Fig. 4 of the drawings, the quartz rod 17, instead of extending around the back of the reflector 16, is arranged at one side of the tube 14, preferably forwardly of the transverse center thereof, so that the light rays from the filament of the tube will pass onto the end of the quartz rod as indicated by the ray path 14b in said figure, thus materially shortening the rod which may be desirable in some uses of the invention.

In Fig. 6 of the drawings, I have shown another modification wherein the end 17b of the quartz rod is extended to a position arranged at right angles to the film guiding device 13 of the film so that the ray path 18 projects in a direction at right angles to the ray path 14a and extends through the lens system 19 which is also at the angular arrangement to suit the beam 18. In this construction, a prism 23 is incorporated between the lens system 19 and the film 10 or the sound track 10b thereon and controls the size of the projected line of light passing through the sound track and onto the prism 21 to the photo-electric cell 20 and through the shade, shutter or screen 22.

This arrangement of the quartz rod is to suit modified types of apparatus wherein it may be difficult to arrange the rod in a manner similar to that shown in the other figures. However, it will be understood at this time, that any desired arrangement of the quartz rod and the manner of its projection of the light rays onto the sound track of the film may be provided.

In Fig. 7 of the drawings, I have diagrammatically shown a modified arrangement of the apparatus. In this figure, 24 represents a source of light in the form of an electric bulb which may be of a high or low voltage and amperage and the rays of light are transmitted from said bulb directly through a quartz rod 25 having a relatively large end 25a and a small end 25b, the latter being arranged adjacent the sound track of a film 26 so as to project a comparatively large area of light through the sound track of the film as indicated at 27. The illuminated image from the sound track is projected through an adjustable lens system 28 which projects the same to form a secondary image at the point indicated at 29 adjacent an opaque or non-transparent wall or diaphragm 30 in which is formed a relatively fine elongated opening 30a through which the image is projected onto the photo-electric cell 31. With this construction, it is not important as to how many of the recorded sound waves of the sound track are included in that part of the light passing from the film as indicated at 27.

It is, in fact, desirable to enlarge and magnify the photographic representations of sound waves to simplify their transmission onto the photo-electric cell by passing through the slit 30a arranged adjacent the secondary image 29. That is to say, while one representation of a sound wave on the film may be the minutest fraction of an inch, it may be enlarged and dealt with on a scale rendering it practical to employ a mechanical slit control.

The same results accomplished with the structure shown in Fig. 7 may also be accomplished with the structure shown in Fig. 9, which figure differentiates from the structure shown in Fig. 7 primarily in the substitution of a projecting lens 32 for the quartz rod 25. In other respects, like references designate like parts comparatively in said figures.

Upon an examination of the path of projection of light through the film and the lens system and onto and through the opaque plate 30, it will be seen that a comparatively small image picked up from the film as indicated at 33, is enlarged to form a comparatively large image as seen at 34, so that even though the slit 30a were comparatively large in transverse dimensions, it would be sufficiently small to coincide with the finest representations of sound waves appearing on the sound track of the film.

Another outstanding feature of my invention resides in the fact that each section 10c of a sound track on the film 10 coincides with and operates in conjunction with the adjacent picture section 10d of the film. That is to say, the picture representation of vocal or instrumental sound of each picture section has arranged at one side thereof and in synchronism therewith, the photographic representation of sound waves arranged in the sound track 10b. This relative arrangement is made possible by virtue of employing a projecting machine in which the film feed mechanism is of a continuous feed type rather than the intermittent feed type, in which latter type of machines, it is customary to arrange the sound representation on the sound track in longitudinally spaced relation with respect to the film picturing the creating means of such sound.

It will be apparent, that while I have referred specifically to the application of my invention to projecting and sound reproducing apparatus, that the fundamental principles of my invention may also be utilized for recording purposes, especially with respect to the use of the quartz rod and the means for the production of the secondary image, as well as in the magnification of the secondary image. It will also be apparent that in enlarging or magnifying the image, and forming a secondary image, the said secondary image, by virtue of its enlargement, travels at a greater rate of speed with respect to the first image in proportion to the ratio of enlargement.

It will be understood that while I have indicated several arrangements for transmitting light from a suitable source onto and through the sound track of a film in the reproduction of sound, and have illustrated certain of these novel arrangements in combination with the source of light for projecting a picture of the film, it will be understood that my invention is not necessarily limited to the structural arrangements herein shown and described and various changes therein and modifications thereof may be made within the scope of the appended claims without departing from the spirit of my invention or sacrificing its advantages.

Having fully described my invention, what I claim as new and desire to secure by Letters Patent, is:

1. In projecting apparatus of the class described employing a source of light for projecting motion pictures from a film onto a screen, means exposed to said light source for transmitting a relatively wide and thin light beam onto and through the sound track of a film and projected onto a photo-electric cell, and said means involving an elongated quartz rod, one end of which is exposed to the light source whereby the rays from said light will pass longitudinally through said rod, and the other end having means for projecting light from said source and rod through said relatively wide and thin path.

2. In projecting apparatus of the class described employing a source of light for projecting motion pictures from a film onto a screen, means exposed to said light source for transmitting a relatively wide and thin light beam onto and through the sound track of a film and projected onto a photo-electric cell, said means involving an elongated quartz rod, one end of which is exposed to the light source whereby the rays from said light will pass longitudinally through said rod and the other end having means for projecting light from said source and rod through said relatively wide and thin path, and a lens system for controlling the projection of light from said quartz rod onto the sound track of the film.

3. In projecting apparatus of the class described employing a source of light for projecting motion pictures from a film onto a screen, means exposed to said light source for transmitting a relatively wide and thin light beam onto and through the sound track of a film and projected onto a photo-electric cell, said means involving an elongated quartz rod, one end of which is exposed to the light source whereby the rays from said light will pass longitudinally through said rod and the other end having means for projecting light from said source and rod through said relatively wide and thin path, a lens system for controlling the projection of light from said quartz rod onto the sound track of the film, and adjustable means interposed between the source of light and the photo-electric cell for regulating the characteristics of the light.

4. In sound reproduction for transmitting a photographically recorded sound track on a film onto a photo-electric cell, means for transmitting a beam of light through the sound track of the film, comprising in combination with a source of light, an elongated quartz rod one end of which is exposed to the light source and into and longitudinally through which the light forming said beam passes, and an adjustable lens system controlling the dimensions of the light beam to accurately project the successive, photographically recorded sound representations of the film onto the photo-electric cell.

5. In sound reproduction for transmitting a photographically recorded sound track on a film onto a photo-electric cell, means for transmitting a beam of light through the sound track of the film, comprising in combination with a source of light, an elongated quartz rod one end of which is exposed to the light source and into and longitudinally through which the light forming said beam passes, an adjustable lens system controlling the dimensions of the light beam to accurately project the successive, photographically recorded sound representations of the film onto the photo-electric cell, and adjustable means intermediate the lens system and photoelectric cell for controlling the characteristics of the light beam projected onto the photo-electric cell.

6. In a sound reproducing apparatus of the class described employing a sound track arranged on a film and a source of light to be projected through the film onto a photo-electric cell, a quartz rod interposed between the source of light and said film and through which the light beam projected onto the film is adapted to pass, means at the free end of said rod for controlling the characteristics of the light beam projected therefrom, and an adjustable lens system interposed between the end of said rod and said film and adapted to reduce the light beam to a relatively fine line arranged over and in parallelism with the photographically recorded sound waves on said sound track.

7. In a sound reproducing apparatus of the class described employing a sound track arranged on a film and a source of light to be projected through the film onto a photo-electric cell, a quartz rod interposed between the source of light and said film and through which the light beam projected onto the film is adapted to pass, means at the free end of said rod for controlling the characteristics of the light beam projected therefrom, an adjustable lens system interposed between the end of said rod and said film and adapted to reduce the light beam to a relatively fine line arranged over and in parallelism with the photographically recorded sound waves on said sound track, and means positioned between the sound track of the film and said photo-electric cell for projecting the light beam onto said photo-electric cell.

8. In a sound reproducing apparatus of the class described employing a sound track arranged on a film and a source of light to be projected through the film onto a photo-electric cell, a quartz rod interposed between the source of light and said film and through which the light beam projected onto the film is adapted to pass, means at the free end of said rod for controlling the characteristics of the light beam projected therefrom, an adjustable lens system interposed between the end of said rod and said film and adapted to reduce the light beam to a relatively fine line arranged over and in parallelism with the photographically recorded sound waves on said sound track, means positioned between the sound track of the film and said photo-electric cell for projecting the light beam onto said photo-electric cell, and other means adjustable relatively to the light beam between the sound track and photo-electric cell for controlling the characteristics of said beam.

9. In moving picture projection, a sound reproduction apparatus of the class described employing a source of light for projecting pictures of the film onto a screen, a reflector associated with said light for intensifying the transmission of light to the film, a sound track arranged adjacent the picture of said film and a quartz rod, one end of which is arranged centrally of said reflector and exposed to the light source, and the other end of which is arranged in position to project a light beam from said source through said sound track for projection onto a photo-electric cell.

10. In picture and sound projecting apparatus of the class described employing a continuously operated film including a sound track arranged adjacent the picture images on said film with the sound record in said track arranged in opposed relation to and in synchronism with the picture representation of such sound, a single source of light, means for projecting independent light beams from said source through the picture section of the film and through said sound track, a photoelectric cell onto which the beam of light projected through the sound track is adapted to pass, said means comprising an elongated quartz rod, one end of which is arranged adjacent and exposed to the light source whereby a light beam will project into and longitudinally through said rod and onto the sound track of the film.

11. In picture and sound projecting apparatus of the class described employing a continuously operated film including a sound track arranged adjacent the picture images on said film with the sound record in said track arranged in opposed relation to and in synchronism with the picture representation of such sound, a single source of light, means for projecting independent light beams from said source through the picture section of the film and through said sound track, a photoelectric cell onto which the beam of light projected through the sound track is adapted to pass, said means comprising an elongated quartz rod, one end of which is arranged adjacent and exposed to the light source whereby a light beam will project into and longitudinally through said rod and onto the sound track of the film, and means at the other end of the quartz rod for regulating the characteristics of the light beam projected therefrom.

12. In a sound reproducing apparatus of the class described, an elongated quartz rod, a source of light, a beam from said light source passing longitudinally through said rod and adapted to be projected onto a sound track and thus onto a photoelectric cell, one end of the rod being arranged and exposed to the source of light and the other end thereof terminating in a relatively narrow elongated surface, an opaque element covering said surface in such manner as to leave centrally and longitudinally thereof a relatively thin slot through which the light passed through said rod is adapted to be projected onto the sound track.

WILHO A. KOSKEN.